US010327161B2

(12) United States Patent
Molinier

(10) Patent No.: US 10,327,161 B2
(45) Date of Patent: Jun. 18, 2019

(54) WIRELESS COMMUNICATION BETWEEN AN ACCESS NETWORK AND A TERMINAL IN RANGE OF A PLURALITY OF BASE STATIONS OF HALF-DUPLEX TYPE OF SAID ACCESS NETWORK

(71) Applicant: SIGFOX, Labege (FR)

(72) Inventor: Lionel Molinier, Toulouse (FR)

(73) Assignee: SIGFOX, Labege (FR)

( * ) Notice: Subject to any disclaimer, the term of this patent is extended or adjusted under 35 U.S.C. 154(b) by 0 days.

(21) Appl. No.: 15/552,261

(22) PCT Filed: Feb. 19, 2016

(86) PCT No.: PCT/FR2016/050395
§ 371 (c)(1),
(2) Date: Aug. 18, 2017

(87) PCT Pub. No.: WO2016/132088
PCT Pub. Date: Aug. 25, 2016

(65) Prior Publication Data
US 2018/0035315 A1 Feb. 1, 2018

(30) Foreign Application Priority Data

Feb. 19, 2015 (FR) ...................................... 15 51396

(51) Int. Cl.
*H04W 24/02* (2009.01)
*H04W 84/08* (2009.01)
(Continued)

(52) U.S. Cl.
CPC ............. *H04W 24/02* (2013.01); *H04L 5/16* (2013.01); *H04W 84/08* (2013.01); *H04W 4/70* (2018.02)

(58) Field of Classification Search
CPC ....... H04W 24/02; H04W 84/08; H04W 4/70; H04L 5/16
See application file for complete search history.

(56) References Cited

U.S. PATENT DOCUMENTS

2002/0022487 A1 2/2002 Ann
2011/0261747 A1* 10/2011 Wang ..................... H04B 7/155
370/315
(Continued)

FOREIGN PATENT DOCUMENTS

| GB | 2 509 912 A | 7/2014 |
| GB | 2 513 181 A | 10/2014 |
| WO | 2015/172041 A1 | 11/2015 |

*Primary Examiner* — Jay P Patel
(74) *Attorney, Agent, or Firm* — Im IP Law; C. Andrew Im; Chai Im

(57) ABSTRACT

A method of communication between an access network and terminals. The access network includes half-duplex base stations, in which, when a downlink message is to be sent, in the course of a predetermined time interval, to a terminal that has sent an uplink message received by several base stations. Reception loads associated respectively with a group of base stations that have received the uplink message sent by the terminal are obtained. Each reception load being representative of a probability of reception, by the corresponding base station, of an uplink message in the course of the time interval. A base station is selected from among the base stations of the group, as a function of the reception loads obtained. The downlink message is transmitted by the selected base station.

13 Claims, 1 Drawing Sheet

(51) Int. Cl.
*H04L 5/16* (2006.01)
*H04W 4/70* (2018.01)

(56) References Cited

U.S. PATENT DOCUMENTS

| | | | |
|---|---|---|---|
| 2013/0142062 A1* | 6/2013 | Dinan | H04W 24/00 370/252 |
| 2014/0029448 A1* | 1/2014 | Balachandran | H04J 11/0059 370/252 |
| 2014/0064234 A1* | 3/2014 | Tong | H04W 72/0413 370/329 |
| 2014/0071856 A1* | 3/2014 | Brisebois | H04W 56/00 370/255 |
| 2014/0106761 A1* | 4/2014 | Lee | H04W 28/16 455/450 |
| 2014/0269518 A1 | 9/2014 | Nigam et al. | |
| 2015/0156780 A1* | 6/2015 | Kim | H04L 5/0035 370/331 |

\* cited by examiner

WIRELESS COMMUNICATION BETWEEN AN ACCESS NETWORK AND A TERMINAL IN RANGE OF A PLURALITY OF BASE STATIONS OF HALF-DUPLEX TYPE OF SAID ACCESS NETWORK

RELATED APPLICATIONS

This application is a § 371 application from PCT/FR2016/050395 filed Feb. 19, 2016, which claims priority from French Patent Application No. 15 51396 filed Feb. 19, 2015, each of which is incorporated herein by reference in its entirety.

TECHNICAL FIELD

The present invention belongs to the field of digital telecommunications, and more particularly relates to a method and a system for wireless communication between an access network and terminals.

BACKGROUND OF THE INVENTION

The present invention is used particularly advantageously, albeit without any kind of limitation, in ultra-narrowband wireless communication systems. The term "ultra-narrowband" (UNB) is understood to mean that the instantaneous frequency spectrum of the radio signals transmitted by the terminals has a frequency width of less than one kilohertz.

Such UNB wireless communication systems are particularly suitable for M2M (machine-to-machine) applications or for applications related to the Internet of things (IoT).

In such a UNB wireless communication system, data exchanges are essentially unidirectional, in this case over an uplink between terminals and an access network of said system.

The terminals transmit uplink messages that are collected by base stations of the access network, without having to associate themselves beforehand with one or more base stations of the access network. Stated otherwise, the uplink messages transmitted by a terminal are not intended for one specific base station of the access network, and the terminal transmits its uplink messages under the assumption that they will be able to be received by at least one base station. Such arrangements are advantageous in that the terminal does not need to take regular measurements, which are intensive particularly from the point of view of power consumption, in order to determine the most appropriate base station to receive its uplink messages. The complexity is on the access network, which needs to be capable of receiving uplink messages that can be transmitted at arbitrary times and at arbitrary center frequencies. Each base station of the access network receives uplink messages from the various terminals that are within its range.

Such a mode of operation, in which data exchanges are essentially unidirectional, is entirely satisfactory for many applications, such as, for example, remote reading of gas, water and electricity meters, remote surveillance of buildings or houses, etc.

In some applications, however, it may be advantageous to be able also to exchange data in the other direction, namely over a downlink from the access network to the terminals, for example in order to reconfigure a terminal and/or control an actuator connected to said terminal. However, it is desirable to provide such a capability while limiting the impact on the cost of deployment of the access network.

To this end, the use of half-duplex base stations, i.e. base stations that may receive uplink messages and transmit downlink messages, but not simultaneously, is envisaged.

However, in such a case, it is understood that a base station that switches to a transmission mode, in order to transmit a downlink message to a terminal, is no longer available for receiving uplink messages transmitted by other terminals, such that numerous uplink messages may thus be missed.

SUMMARY OF THE INVENTION

An aim of the present invention is to overcome all or some of the limitations of the solutions of the prior art, in particular those set out above, by proposing a solution that makes it possible to have bidirectional data exchanges while limiting the number of uplink messages that are missed by the access network.

To this end, and according to a first aspect, the invention relates to a method for wireless communication between an access network and a plurality of terminals, said access network being suitable for transmitting downlink messages to the terminals and for receiving uplink messages transmitted by said terminals, said access network including a plurality of base stations that are configured to transmit downlink messages in transmission windows during which said base stations are unable to receive uplink messages. When a downlink message must be transmitted, within a predetermined time interval, to a terminal having transmitted an uplink message received by multiple base stations, said method includes steps of:

obtainment, by the access network, of quantities referred to as "reception loads" that are associated with a group of respective base stations having received the uplink message transmitted by said terminal, each reception load being representative of a probability of reception, by the base station under consideration, of an uplink message within said time interval;

selection, by the access network, of one base station from among the base stations of the group according to the reception loads that are associated with said base stations of the group for said time interval;

transmission of the downlink message by the base station selected from among the base stations of the group.

Thus, the communication method aims to take advantage of the redundancy in reception provided by the access network, which in certain cases allows one and the same uplink message to be received by multiple base stations. If a downlink message must be transmitted to a terminal, then each base station having received an uplink message from this terminal may be used to transmit said downlink message, since it may be considered that said terminal is within range of each of these base stations.

The invention is thus based on the use of reception loads that are representative, for each base station having received said uplink message, of the probability of reception of an uplink message within the time interval in which the downlink message must be transmitted. By virtue of the use of such reception loads, it is understood that it is possible to select, for the transmission of the downlink message, one base station from among those having the lowest probability of reception, such that the risk of missing one or more uplink messages is decreased.

In particular modes of implementation, the communication method may additionally include one or more of the following features, either taken in isolation or according to any of the technically possible combinations.

In particular modes of implementation, the reception loads used to select the base station are determined according to uplink messages that were previously received by the base stations.

Such arrangements make it possible to self-adapt to the environment of each base station by taking the various uplink messages received previously and the temporal distribution thereof into account, as well as a potential reproduction over time of particular patterns of reception of uplink messages. In particular, in UNB wireless communication systems, the terminals are often configured to transmit uplink messages recurrently and substantially periodically. As such, particular reception patterns will be reproduced over time and could be taken into account for the selection of the base station to be used to transmit the downlink message.

In particular modes of implementation, the reception load of a base station is representative of a probability of reception that is weighted, for each uplink message that is likely to be received by said base station within said time interval, by the probability that this uplink message has also to be received by another base station of the access network.

Such reception loads, which are representative of a weighted probability of reception, are particularly advantageous insofar as they take into account the fact that an uplink message missed by a given base station is not necessarily missed by the access network, which includes other base stations. Thus, even if the base station under consideration is likely to receive numerous uplink messages in the time interval in question, it may nonetheless be used to transmit the downlink message if each uplink message that is likely to be received is also likely to be received by other base stations.

In particular modes of implementation, the communication method includes a prior step of setting up reception schedules that are associated with different respective base stations of the access network, each reception schedule including reception loads that are associated with different respective time intervals in a predefined time window.

Thus, reception schedules are set up beforehand, and preferably updated over time, such that, when a downlink message must be transmitted, the reception loads to be used are available immediately and do not have to be calculated each time a new downlink message must be transmitted. For a base station for which a reception schedule has already been set up, the reception load used in the selection step corresponds to the reception load that is associated, according to the reception schedule of said base station, with the time interval in which said downlink message must be transmitted.

In particular modes of implementation, the reception loads of a reception schedule, in a time window consisting of a number $N_{IT}$ of time intervals $\delta Ti$, where $1 \leq i \leq N_{IT}$, are representative of a weighted probability of reception, the reception load associated with the time interval $\delta Ti$ for a base station of rank n of the group including $N_S$ base stations, where $1 \leq n \leq N_S$, being set up on the basis of a quantity $W_n^{\delta Ti}$ calculated according to the expression:

$$W_n^{\delta Ti} = \frac{\sum_{m=1}^{Ni} \frac{1}{BS_m}}{M}$$

in which expression:

M corresponds to the number of uplink messages received in a preceding time window;

Ni corresponds to the number of uplink messages received in the time interval $\delta Ti$ of the preceding time window;

$BS_m$ corresponds to the number of base stations having received, within the time interval $\delta Ti$ of the preceding time window, the uplink message of rank m, where $1 \leq m \leq Ni$.

In particular modes of implementation, the selection step includes, for each base station of the group, the calculation of the value of a predefined selection function which depends on the reception load, the selected base station being that which optimizes the value of said selection function from among the group of base stations, said selection function varying with said reception load such that the value of the selection function tends to be optimized when the probability of reception of an uplink message within the time interval decreases.

In particular modes of implementation, the selection function additionally depends on a parameter representative of the area of a coverage zone of the base station under consideration, and varies with said parameter such that the value of the selection function tends to be optimized when said area of the coverage zone decreases.

In particular modes of implementation, the selection function additionally depends on a parameter representative of the number of terminals covered solely by the base station under consideration, and varies with said parameter such that the value of the selection function tends to be optimized when said number of terminals decreases.

In particular modes of implementation, the selection function additionally depends on a parameter representative of the quality of a channel between the terminal and the base station under consideration, and varies with said parameter such that the value of the selection function tends to be optimized when said channel quality increases.

In particular modes of implementation, the selection function additionally depends on a parameter representative of the quality of a link between the base station under consideration and a server of the access network, and varies with said parameter such that the value of the selection function tends to be optimized when said link quality increases.

In particular modes of implementation, the selection function additionally depends on a parameter representative of the number of downlink messages transmitted by the base station under consideration since a predefined duration of analysis, and varies with said parameter such that the value of the selection function tends to be optimized when said number of downlink messages decreases.

According to a second aspect, the present invention relates to an access network including a plurality of base stations that are suitable for transmitting downlink messages to terminals, and means that are configured to implement a communication method according to any one of the modes of implementation of the invention.

According to a third aspect, the present invention relates to a wireless communication system including an access network according to any one of the modes of implementation of the invention, and a plurality of terminals.

BRIEF DESCRIPTION OF THE DRAWINGS

The invention will be better understood on reading the following description which is provided by way of completely non-limiting example and with reference to the figures, which show.

In these figures, references that are identical from one figure to another denote elements that are identical or analogous. For the sake of clarity, the elements shown are not to scale, unless stated otherwise.

DETAILED DESCRIPTION OF EMBODIMENTS

Figure 1:
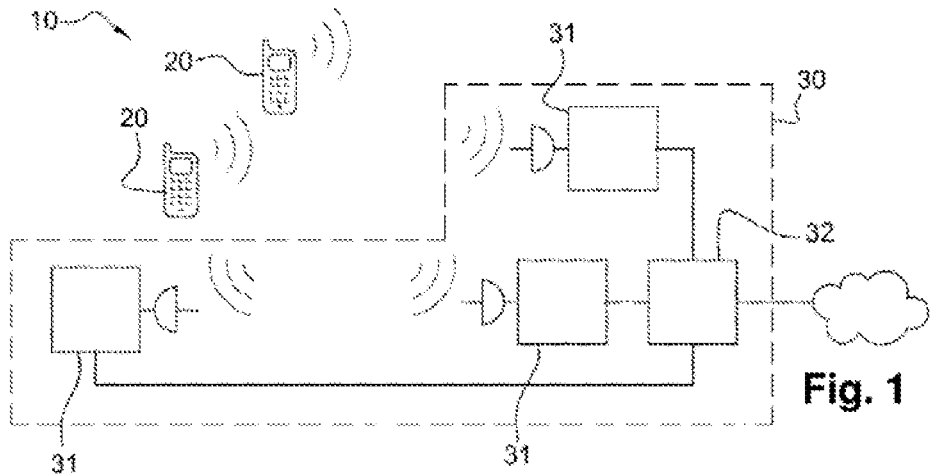
FIG. 1: a schematic representation of a wireless communication system.

FIG. 1 schematically represents a wireless communication system 10, for example of UNB type, including multiple terminals 20 and an access network 30 including multiple base stations 31.

The terminals 20 and the base stations 31 of the access network 30 exchange data in the form of radio signals. The term "radio signal" is understood to mean an electromagnetic wave that is propagated via wireless means, the frequencies of which are comprised in the traditional spectrum of radio waves (a few hertz to several hundred gigahertz).

The terminals 20 are suitable for transmitting uplink messages over an uplink to the access network 30. The uplink messages are for example transmitted asynchronously. The term "transmitted asynchronously" is understood to mean that the terminals 20 autonomously determine when they transmit, without coordination of said terminals 20 with one another and with the base stations 31 of the access network 30.

Each base station 31 is suitable for receiving the uplink messages from the terminals 20 that are within its range. Each uplink message thus received is for example transmitted to a server 32 of the access network 30, potentially accompanied with other information such as an identifier of the base station 31 that received it, the measured power of said received uplink message, the date of reception of said uplink message, etc. The server 32 processes for example all of the uplink messages received from the various base stations 31.

Additionally, the access network 30 is also suitable for transmitting, via base stations 31, downlink messages over a downlink to terminals 20, which are suitable for receiving them. The downlink messages are for example transmitted on the initiative of the access network 30. In such a case, the terminals 20 must continuously listen to the downlink, in the expectation of a potential downlink message. The access network 30 may also transmit a downlink message in response to each uplink message received, or else transmit downlink messages only in response to certain uplink messages. For example, the access network 30 may respond only after having received a predefined number of uplink messages from one and the same terminal 20, or respond only to uplink messages including a request to that effect, etc.

Throughout the rest of the description, it will be assumed in a non-limiting manner that the access network 30 transmits downlink messages in response to all or some of the uplink messages transmitted by the terminals 20.

In order to decrease the cost of deployment of the access network 30, the base stations 31 are of half-duplex type. Stated otherwise, these base stations 31 may receive uplink messages and transmit downlink messages, but not simultaneously. Thus, each base station 31 may alternatively be set to:

a reception mode, in which said base station 31 may receive uplink messages in a reception window but may not transmit downlink messages;

a transmission mode, in which said base station 31 may transmit downlink messages in a transmission window but may not receive uplink messages.

In the rest of the description, it will be assumed in a non-limiting manner that each terminal 20 is of synchronous reception type. Stated otherwise, each terminal 20 may receive a downlink message only within a listening window that is predetermined with respect to the last uplink message transmitted by said terminal 20.

Because they do not have to transmit and receive simultaneously, such terminals 20 are, in preferred embodiments, of half-duplex type, in order to decrease manufacturing costs.

The listening window of a terminal 20 may start immediately after having transmitted an uplink message, especially if the response times of the access network 30 are short. However, in preferred embodiments, each terminal 20, after having transmitted an uplink message, is configured to switch to a standby mode for a standby window of predetermined duration that is also known to the access network 30. Conventionally, standby mode is an operating mode that is optimized to decrease power consumption, in which said terminal 20 may in particular neither receive downlink messages nor transmit uplink messages. For example, the duration of the standby window is chosen to be equal to or longer than the minimum response time of the access network 30.

In the rest of the description, it will be assumed in a non-limiting manner that each terminal 20 is configured to switch to standby mode after having transmitted an uplink message.

After the standby window, the terminal 20 leaves standby mode in order to listen to the downlink in the expectation of a downlink message, for a listening window of predetermined duration that is equal to or longer than the duration of the downlink message that must be received from the access network.

It should be noted that, if a terminal 20 is a priori aware that no downlink message will be transmitted by the access network 30 (for example because the uplink message that it transmitted did not include a request to that effect), then said terminal 20 does not listen to the downlink and preferably remains in standby mode, for example until the transmission of the next uplink message.

Figure 2:
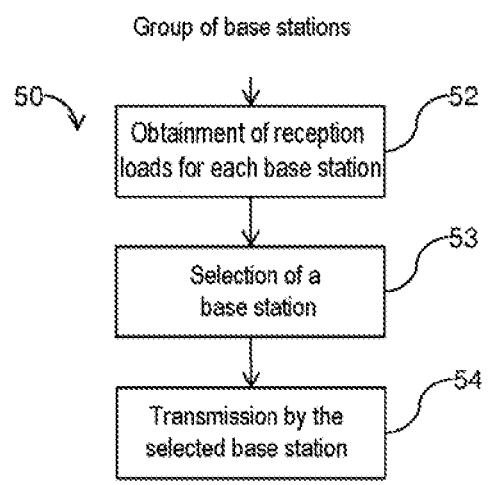
FIG. 2: a diagram illustrating the main steps of a wireless communication method.

FIG. 2 schematically represents the main steps of a communication method 50, which is based on the fact that, most of the time, each uplink message transmitted by a terminal 20 is received by multiple base stations 31 of the access network 30. In such a case, said terminal 20 having transmitted this uplink message is considered to be within range of these base stations 31, and each of these base stations may be used to transmit a downlink message to said terminal 20.

As illustrated in FIG. 2, when a downlink message must be transmitted, within a predetermined time interval, to a terminal 20 having transmitted an uplink message received by multiple base stations 31, said method 50 includes a step 52 of obtaining quantities referred to as "reception loads" that are associated with a group of respective base stations 31 having received the uplink message transmitted by said terminal 20, each reception load being representative of a probability of reception, by the base station under consideration, of an uplink message within said time interval;

a step 53 of selecting one base station 31 from among the base stations of the group according to the reception loads that are associated with said base stations of the group for said time interval;

a step 54 of transmitting of the downlink message by the base station 31 selected from among the base stations of the group.

The communication method 50 is implemented by the access network 30 which includes means configured to implement the various steps of said method 50.

In particular, the base stations 31 and the server 32 include respective processing modules (not shown in the figures). Each processing module includes for example one or more processors and storage means (magnetic hard disk, electronic memory, optical disk, etc.) in which a computer program product is stored in the form of a set of program code instructions to be executed in order to implement the various steps of the communication method 50. In one variant, each processing module includes one or more programmable logic circuits of FPGA, PLD, etc. type, and/or specialized integrated circuits (ASIC) that are suitable for implementing all or some of said steps of the communication method 50.

Each base station 31 additionally includes wireless communication means, which are considered to be known to those skilled in the art, allowing said base station to receive uplink messages and to transmit downlink messages. The base stations 31 and the server 32 also include respective network communication means, which are considered to be known to those skilled in the art, allowing the server 32 to exchange data with each base station 31.

Stated otherwise, the access network 30 includes a set of means that are configured by software (specific computer program product) and/or on hardware (FPGA, PLD, ASIC, etc.) in order to implement the various steps of the communication method 50.

In the rest of the description, it will be assumed in a non-limiting manner that the obtainment step 52 and the selection step 53 are executed by the server 32 of the access network 30, the transmission step 54 being executed by the selected base station 31. Other distributions of the various operations to be carried out may however be envisaged.

Non-limiting examples of implementation of the obtainment step 52 and of the selection step 53 of the communication method 50 will now be described in greater detail.

A) Obtainment of Reception Loads

As mentioned above, the communication method 50 first includes a step 52 of obtaining reception loads that are associated with a group of respective base stations 31 having received the uplink message transmitted by said terminal 20.

The group preferably includes all of the base stations 31 having received said uplink message, but may include, in certain cases, only a subset thereof. For example, it is possible to consider only a subset of the base stations 31 having received said uplink message if one of these base stations, at least, is configured to respond only to certain terminals 20, or is temporarily unavailable to transmit downlink messages, etc.

For each base station 31 of the group under consideration, the obtained reception load is representative of a probability of reception, by the base station 31 under consideration, of an uplink message within the time interval in which the downlink message must be transmitted. In the case under consideration here, by way of non-limiting example, in which the downlink message must be transmitted within the listening window of the terminal 20, the time interval under consideration corresponds substantially to said listening window of said terminal 20.

It is understood that, by considering such reception loads, it is possible to select, for the transmission of the downlink message, one base station 31 having a low probability of reception for the time interval under consideration, such that the risk of missing one or more uplink messages may be greatly decreased.

The reception loads are for example determined by the server 32, according to a priori knowledge of the times of transmission of uplink messages from the various terminals 20, and of the various base stations 31 that are likely to receive these uplink messages.

Preferably, the reception loads are determined according to uplink messages that were previously received by the various base stations 31. Specifically, if the terminals 20 are configured to transmit uplink messages recurrently and substantially periodically, then particular reception patterns will be reproduced over time. Said uplink messages that were previously received by the various base stations 31 then make it possible to have a priori knowledge of the times of transmission of uplink messages from the various terminals 20, and of the various base stations 31 that are likely to receive these uplink messages.

The reception loads used may be determined each time a downlink message must be transmitted, or may be determined before being aware that a downlink message must be transmitted.

Figure 3:
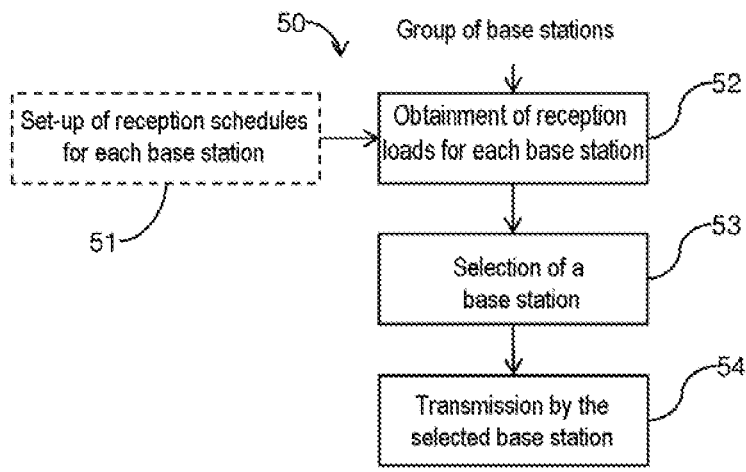
FIG. 3: a diagram illustrating one preferred mode of implementation of a wireless communication method.

FIG. 3 schematically represents one preferred mode of implementation, in which the communication method 50 additionally includes a prior step 51 of setting up said reception loads for each base station 31 of the access network 30 according to uplink messages that were previously received by the various base stations 31.

For example, in the set-up step 51, reception schedules that are associated with different respective base stations 31 are determined, each reception schedule including the reception loads that are associated with different respective time intervals in a predefined time window. The reception schedules are preferably set up for each base station 31 of the access network 30, for example by the server 32, according to the uplink messages received by the various base stations 31 and transmitted thereby to said server 32. However, in certain cases, said reception schedules may be set up by the base stations 31 and transmitted to the server 32.

The time window consists for example of a number $N_{IT}$ of time intervals $\delta T_i$, where $1 \leq i \leq N_{IT}$. In order to limit the calculations required to set up the reception schedules, time intervals $\delta T_i$ the duration of which is longer than that of the listening windows of the terminals 20 are preferably considered, in order to limit the temporal resolution with which reception loads must be calculated. For example, the time window in which the reception schedules are determined corresponds to a duration of 24 hours, and each time interval $\delta T_i$ corresponds to a duration of one hour within said time window. The number $N_{IT}$ of time intervals $\delta T_i$ is for example equal to 24 in the case of time intervals without temporal overlap, but may also be greater than 24 in order to have time intervals exhibiting a temporal overlap that is non-zero in order to avoid the case in which the listening window of a terminal 20 straddles two consecutive time intervals.

In the rest of the description, it will be assumed in a non-limiting manner that a time window of 24 hours includes 24 ($N_{IT}$=24) time intervals $\delta T_i$ of one hour. For example, the time interval $\delta T_i$ is between (i−1) hour(s) and i hour(s), where $1 \leq i \leq N_{IT}$.

Thus, the access network 30 may set up a reception schedule for each base station 31, and may update it every 24 hours according to the uplink messages received over the last 24 hours. For example, the reception loads of a time window $\Delta T_j$ are determined according to the uplink messages received within a preceding time window $\Delta T_{j-1}$.

The obtainment step 52 then consists, for the base stations 31 of the group for which reception schedules have already been set up, in retrieving, from said reception schedules of the time window $\Delta T_j$, the reception loads associated with the time interval $\delta T_i$ corresponding to the listening window of the terminal 20 to which the downlink message must be transmitted.

As mentioned above, each reception load is representative, for each base station 31 under consideration, of the probability of reception of an uplink message within the time interval under consideration. It is possible to envisage the reception loads being expressed in various ways, as long as they are indeed representative of the probability of reception of an uplink message within the time interval under consideration.

According to a first non-limiting example, the reception load associated with the time interval $\delta T_i$ of the time window $\Delta T_j$, for a base station 31 of rank n from among the base stations of the access network 30, is set up on the basis of a quantity $W_n^{\delta T_i}$ calculated according to the expression:

$$W_n^{\delta T_i} = \frac{Ni}{M}$$

in which expression:
M corresponds to the number of uplink messages received by the base station 31 of rank n in the preceding time window $\Delta T_{j-1}$;
Ni corresponds to the number of uplink messages received by the base station 31 of rank n in the time interval $\delta T_i$ of the preceding time window $\Delta T_{j-1}$ (such that the sum of Ni, where $1 \leq i \leq N_{IT}$, is equal to M).

Such a quantity $W_n^{\delta T_i}$ indeed corresponds, according to the uplink messages received over the last 24 hours, to the probability of reception of an uplink message within the time interval $\delta T_i$ by the base station 31 of rank n. Additionally, such quantities $W_n^{\delta T_i}$ may be set up directly by each base station 31.

According to another non-limiting example, the quantity $W_n^{\delta T_i}$ is preferably calculated according to the expression:

$$W_n^{\delta T_i} = \frac{\sum_{m=1}^{Ni} \frac{1}{BS_m}}{M}$$

in which expression $BS_m$ corresponds to the number of base stations 31 having received, within the time interval $\delta T_i$ of the preceding time window $\Delta T_{j-1}$, the uplink message of rank m from among the Ni uplink messages received by the base station 31 of rank n, where $1 \leq m \leq Ni$.

Such a quantity $W_n^{\delta T_i}$ is particularly advantageous in that it is representative of a weighted probability of reception, which takes into account, for each uplink message that is likely to be received by the base station 31 under consideration within the time interval $\delta T_i$, the probability that this uplink message has also to be received by another base station 31 of the access network 30. Stated otherwise, such a weighted probability of reception is representative of a probability of loss of an uplink message in the case of transmission by the base station 31 under consideration within the time interval $\delta T_i$ of the time window $\Delta T_j$.

It should be noted however that such a quantity $W_n^{\delta T_i}$ that is representative of the weighted probability of reception does not lead, in the time window $\Delta T_j$, to having a probability in the mathematical sense of the term, in which the sum of all of the possible outcomes is equal to 1. In general, the term "probability of reception" is understood to mean a function the value of which increases with the number of uplink messages that are likely to be received.

The reception loads of the reception schedules in the time window $\Delta T_j$ are for example equal to the quantities $W_n^{\delta T_i}$ calculated on the basis of the uplink messages received within the preceding time window $\Delta T_{j-1}$. Preferably, such quantities $W_n^{\delta T_i}$ are calculated for multiple preceding time windows $\Delta T_{j-1}$, $\Delta T_{j-2}$, $\Delta T_{j-3}$, etc., and are combined, for example via a weighted mean, in order to obtain the reception loads of the reception schedule in the time window $\Delta T_j$ to be used in the obtainment step 52.

B) Selection of a Base Station

In step 53, the server 32 selects, according to the reception loads obtained for the various base stations 31 of the group and for the time interval under consideration, the base station 31 that will be used to transmit the downlink message to the terminal 20.

For example, the server 32 may select the base station 31 the reception load of which corresponds to the lowest probability of reception, such that the number of uplink messages that are likely to be missed is greatly decreased.

It is also possible, in particular modes of implementation, to calculate, for each base station 31 of the group, the value of a predefined selection function F which depends on the reception load. The selection function F varies with said reception load such that the value of the selection function F tends to be optimized when the probability of reception of an uplink message decreases, and the selected base station 31 is preferably that which optimizes the value of said selection function F from among the group of base stations.

In the rest of the description, it will be assumed in a non-limiting manner that the optimization of the value of the selection function F consists in maximizing said value for the base stations 31 of the group for the time interval under consideration. However, according to other examples, there is nothing to rule out considering a selection function F such that the optimization of the value of said selection function consists in minimizing said value.

For example, the value of the selection function F is calculated according to the following expression:

$$\frac{1}{1 + p_R[n]}$$

in which expression $p_R[n]$ corresponds to the reception load of the base station 31 of rank n under consideration for the time interval within which the downlink message must be transmitted. For example, the reception load $p_R[n]$ corresponds to the quantity $W_n^{\delta T_i}$ calculated according to any one of the preceding expressions.

The use of a selection function F is particularly advantageous when other parameters, other than the single reception load, must be taken into account in order to select the base station 31 for transmitting the downlink message. If necessary, the selection function F includes for example at least two components, one component of which, referred to as the "reception load component" $f_{CR}$, is calculated according to the reception load, for example according to the following expression:

$$f_{CR}[n] = \frac{1}{1 + p_R[n]}$$

In particular modes of implementation, the selection function F includes at least one component, in addition to the reception load component $f_{CR}$, from among the components described below.

According to a first example, the selection function F includes a component, referred to as the "coverage component" $f_{COV}$, that depends on a parameter representative of the area of a coverage zone of the base station 31 under consideration, and varies with said parameter such that the value of the selection function F increases when said area of the coverage zone decreases.

By virtue of such a coverage component $f_{COV}$, it is possible to favor, for the transmission of the downlink message, base stations 31 having a coverage zone of small area. Specifically, a base station 31 with a coverage zone of small area in principle serves fewer terminals 20 than a base station 31 with a coverage zone of large area. Additionally, the probability that a mobile terminal 20 is located within a given coverage zone decreases with the area thereof.

For example, the value of the coverage component $f_{COV}$ for a base station 31 of rank n is calculated according to the expression:

$$f_{COV}[n] = \frac{\sum_{m=1}^{N_s} COV[m]}{COV[n]}$$

in which expression:
- $N_S$ corresponds to the number of base stations 31 of the group, where $1 \leq n \leq N_S$;
- COV[i] corresponds to the area of the coverage zone of the base station 31 of rank i, where $1 \leq i \leq N_S$.

According to another example, the selection function F includes a component, referred to as the "isolation component" $f_{ISO}$, that depends on a parameter representative of the number of terminals 20 that are covered solely by the base station 31 under consideration, and varies with said parameter such that the value of the selection function F increases when said number of terminals decreases.

By virtue of such an isolation component $f_{ISO}$, it is possible to favor, for the transmission of the downlink message, the base stations 31 serving terminals 20 the uplink messages of which are also received by other base stations.

For example, the value of the isolation component $f_{ISO}$ for a base station 31 of rank n is calculated according to the expression:

$$f_{ISO}[n] = \frac{1 + d_{SINGLE}[n]}{1 + \sum_{m=1}^{N_s} d_{SINGLE}[m]}$$

in which expression $d_{SINGLE}[i]$ corresponds to the number of terminals 20 that are covered solely by the base station of rank i, where $1 \leq i \leq N_S$.

According to another example, the selection function F includes a component, referred to as the "channel quality component" $f_{QC}$, that depends on a parameter representative of the quality of a channel between the terminal 20 and the base station 31 under consideration, and varies with said parameter such that the value of the selection function F increases when said channel quality increases.

By virtue of such a channel quality component $f_{QC}$, it is possible to favor, for the transmission of the downlink message, the base stations 31 for which the quality of the channel with the terminal 20 is good enough to ensure that the downlink message will indeed be able to be received and decoded by said terminal 20.

For example, the value of the channel quality component $f_{QC}$, for a base station of rank n, is calculated according to the expression:

$$f_{QC}[n] = \frac{Q_C[n]}{\sum_{m=1}^{N_s} Q_C[m]}$$

in which expression $Q_C[i]$ corresponds to the value of the quality of the channel between the terminal 20 and the base station 31 of rank i, where $1 \leq i \leq N_S$. For example, the value of the quality of the channel between the terminal 20 and a base station 31 may be estimated on the basis of the measured power of an uplink message transmitted by said terminal 20 and received by the base station 31 under consideration.

According to another example, the selection function F includes a component, referred to as the "network quality component" $f_{QR}$, that depends on a parameter representative of the quality of a link between the base station 31 under consideration and the server 32 of the access network 30, and varies with said parameter such that the value of the selection function F increases when said link quality increases.

By virtue of such a network quality component $f_{QR}$, it is possible to favor, for the transmission of the downlink message, the base stations 31 for which the quality of the link with the server 32 is good enough to ensure that the downlink message, transmitted beforehand from the server 32 to the selected base station 31, will indeed be able to be received by said base station 31 and subsequently transmitted to the terminal 20.

For example, the value of the network quality component $f_{QR}$, for a base station 31 of rank n, is calculated according to the expression:

$$f_{QR}[n] = \frac{Q_L[n]}{\sum_{m=1}^{N_s} Q_L[m]}$$

in which expression $Q_L[i]$ corresponds to the value of the quality of the link between the server 32 and the base station 31 of rank i, where $1 \leq i \leq N_S$. For example, the value of the quality of the link between the server 32 and a base station 31 may be estimated on the basis of a measurement of a round-trip time between said server 32 and said base station 31.

According to another example, the selection function F includes a component, referred to as the "transmission activity component" $f_{AE}$, that depends on a parameter representative of the number of downlink messages transmitted by the base station 31 under consideration since a predefined duration of analysis, and varies with said parameter such that the value of the selection function F increases when said number of downlink messages decreases.

Such arrangements make it possible to avoid selecting the same base station 31 too often for the purpose of transmitting downlink messages.

For example, the value of the transmission activity component $f_{AE}$ for a base station 31 of rank n is calculated according to the expression:

$$f_{AE}[n] = \frac{\sum_{m=1}^{N_s} \log(k[m])}{\log(k[n])}$$

in which expression:
log(x) corresponds to the logarithmic function of the number x;
k[i] corresponds to the number of downlink messages transmitted since the duration of analysis by the base station 31 of rank i, where $1 \leq i \leq N_S$.

For example, the duration of analysis is equal to the duration of the time window, considered here to be equal to 24 hours, such that the number k[i] corresponds to the number of downlink messages transmitted within the time window $\Delta T_{j-1}$ by the base station 31 of rank i, where $1 \leq i \leq N_S$.

As mentioned above, the selection function F includes at least one reception load component $f_{CR}$, and may include, in particular modes of implementation, at least one additional component from among the following components:
coverage component $f_{COV}$;
isolation component $f_{ISO}$;
channel quality component $f_{QC}$;
network quality component $f_{QR}$;
transmission activity component $f_{AE}$.

When the selection function F includes multiple components, these are combined, for example added to and/or multiplied by one another, and potentially weighted by respective weighting coefficients.

In preferred modes of implementation, the selection function F includes all of the components described above, for example combined according to the following expression:

$$F = a \cdot f_{CR} \cdot f_{COV} \cdot f_{ISO} + b \cdot f_{QL} \cdot f_{QR} + c \cdot f_{AE}$$

in which expression a, b and c correspond to weighting coefficients which allow the importance of the various components under consideration in the selection of the base station 31 to be adjusted.

Once the value of the selection function F has been calculated for each base station 31 of the group, it is possible to select, for the transmission of the downlink message, the base station 31 that allowed the highest value of said selection function F to be obtained. Once a base station 31 has been selected by the server 32, said server 32 transmits the downlink message to the selected base station 31, which transmits it over the downlink to the terminal 20 in step 54.

More generally, it should be noted that the embodiments and modes of implementation considered above have been described by way of non-limiting examples, and as such other variants may be envisaged.

In particular, the invention has been described under the assumption that a single base station 31 is selected and used to transmit a downlink message to a terminal 20. However, according to other examples, there is nothing to rule out selecting two or more base stations 31 to transmit said downlink message in order to benefit for example from a certain spatial diversity in transmission and thus improve the signal-to-noise ratio of the downlink message received by said terminal 20.

Additionally, the invention has been described under the assumption that a downlink message is transmitted in response to an uplink message. However, according to other examples, there is nothing to rule out transmitting a downlink message within an arbitrary time interval that is not determined by a listening window of a terminal 20. If necessary, the terminal 20 must be capable of receiving a downlink message at any time.

Additionally, the invention has been described under the assumption that the duration of the time intervals is longer than the duration of the listening windows of the terminals 20. However, according to other examples, there is nothing to rule out considering time intervals of shorter duration than the duration of the listening windows of the terminals 20. If necessary, multiple reception loads may be obtained for one and the same listening window of a terminal 20, which reception loads are associated with various respective time intervals within said listening window. It is then possible to select the base station/time interval pair that makes it possible to minimize the risk of missing uplink messages, for example by selecting the base station/time interval pair that makes it possible to optimize the value of the selection function F from among the various base stations 31 of the group and from among the various time intervals within the listening window of the terminal 20.

Additionally, it should be noted that the invention has been described under the assumption that the communication method 50 is executed as soon as it is possible to use multiple base stations 31 to transmit a downlink message to a terminal 20. However, according to other examples, there is nothing to rule out the execution of the communication method 50 being dependent on certain conditions being met. For example, if a downlink message must be transmitted to a terminal 20 within range of a base station 31 for which a transmission window has previously been configured for another downlink message, and this transmission window is located within the listening window of said terminal 20 under consideration, then the downlink message intended for said terminal 20 under consideration is preferably grouped together with the other downlink message and transmitted by this base station 31, within the same transmission window, without having to execute the various steps of the communication method 50.

The invention claimed is:

1. A method for wireless communication between an access network and a plurality of processor based terminals, the access network is configured to transmit downlink messages to the terminals and to receive uplink messages transmitted by the terminals, the access network comprises a plurality of half-duplex base stations, each base station comprising a processor and a wireless transmitter/receiver, the method comprises a step of transmitting a downlink message within a predetermined time interval to a terminal having transmitted an uplink message received by multiple base stations by:

obtaining, by the access network, reception loads that are associated with respective base stations of a group, the base stations of the group having received the uplink message transmitted by the terminal, each reception load is representative of a probability of reception of the uplink message within the timer interval by a respective base station;

selecting, by the access network, one base station from among the base stations of the group according to the reception loads that are associated with the respective base stations of the group; and transmitting the downlink message by the selected base station from among the group of the base stations.

2. The method as claimed in claim 1, wherein the reception loads used in selecting the selected base station are determined according to uplink messages that were previously received by the base stations.

3. The method as claimed in claim 1, wherein the reception load of a base station is representative of a probability of reception that is weighted, for each uplink message received by the base station within the time interval, by a probability that said each uplink message is also received by another base station of the access network.

4. The method as claimed in claim 1, further comprising a step of setting up reception schedules that are associated with different respective base stations of the access network, each reception schedule includes reception loads that are associated with different respective time intervals in a predefined time window.

5. The method as claimed in claim 4, wherein the reception loads of a reception schedule, in a time window consisting of a number $N_{IT}$ of time intervals $\delta Ti$, where $1 \le i \le N_{IT}$, are representative of a weighted probability of reception, the reception load associated with a time interval $\delta Ti$ for a base station of rank n of the group including $N_S$ base stations, where $1 \le n \le N_S$, being set up on the basis of a quantity $W_n^{\delta Ti}$ calculated according to the expression:

$$W_n^{\delta Ti} = \frac{\sum_{m=1}^{Ni} \frac{1}{BS_m}}{M}$$

in which expression:
  M corresponds to a number of uplink messages received in a preceding time window;
  Ni corresponds to a number of uplink messages received in the time interval $\delta Ti$ of the preceding time window; and
  $BS_m$ corresponds to a number of base stations having received, within the time interval $\delta Ti$ of the preceding time window, an uplink message of rank m, where $1 \le m \le Ni$.

6. The method as claimed in claim 1, wherein the step of selecting comprises, for each base station of the group, calculating a value of a predefined selection function which depends on the respective reception load; wherein the selected base station optimizes the value of the predefined selection function among the group of base stations; and wherein the predefined selection function varies with the respective reception load such that the value of the predefined selection function tends toward optimization as the probability of reception of the uplink message within the time interval decreases.

7. The method as claimed in claim 6, wherein the predefined selection function additionally depends on a parameter representative of an area of a coverage zone of said each base station, and varies with the parameter such that the value of the predefined selection function tends toward optimization as the area of the coverage zone decreases.

8. The method as claimed in claim 6, wherein the predefined selection function additionally depends on a parameter representative of a number of terminals covered solely by said each base station, and varies with the parameter such that the value of the predefined selection function tends toward optimization as the number of terminals decreases.

9. The method as claimed in claim 6, wherein the predefined selection function additionally depends on a parameter representative of a quality of a channel between the terminal and said each base station, and varies with the parameter such that the value of the predefined selection function tends toward optimization as the quality of the channel increases.

10. The method as claimed in claim 6, wherein the predefined selection function additionally depends on a parameter representative of a quality of a link between said each base station and a server of the access network, and varies with the parameter such that the value of the predefined selection function tends toward optimization as the quality of the link increases.

11. The method as claimed in claim 6, wherein the predefined selection function additionally depends on a parameter representative of a number of downlink messages transmitted by said each base station, and varies with the parameter such that the value of the predefined selection function tends toward optimization as the number of downlink messages decreases.

12. An access network comprising a plurality of half-duplex base stations that are configured to transmit downlink messages to terminals, each base station comprising a processor and a wireless transmitter/receiver; and a processor based server configured to implement the steps of the wireless communication method as claimed in claim 1.

13. A wireless communication system comprising the access network as claimed in claim 12, and a plurality of processor based terminals.

* * * * *